United States Patent [19]
Porta et al.

[11] 4,350,575
[45] Sep. 21, 1982

[54] METHOD FOR PREPARING AN AQUEOUS TREATMENT SOLUTION CONTAINING AT LEAST HYDROGEN PEROXIDE IONS AND HYDROXYL IONS IN PREDETERMINED CONCENTRATIONS

[75] Inventors: Augusto Porta, Geneva, Switzerland; Jean-Marie Fresnel, Haut-Thoiry, France; Antonin Kulhanek, Le Lignon, Switzerland

[73] Assignee: Battelle Memorial Institute, Carouge, Switzerland

[21] Appl. No.: 130,167

[22] PCT Filed: Dec. 4, 1978

[86] PCT No.: PCT/CH78/00044
§ 371 Date: Aug. 6, 1979
§ 102(e) Date: Jul. 23, 1979

[87] PCT Pub. No.: WO79/00347
PCT Pub. Date: Jun. 28, 1979

[30] Foreign Application Priority Data
Dec. 6, 1977 [CH] Switzerland ............... 14876/77

[51] Int. Cl.³ .............................................. C25B 1/30
[52] U.S. Cl. ................................. 204/84; 204/263
[58] Field of Search ................. 204/84, 83, 95, 263

[56] References Cited

U.S. PATENT DOCUMENTS

| | | | |
|---|---|---|---|
| 3,591,470 | 7/1971 | Grangaard | 204/84 |
| 3,607,687 | 9/1971 | Grangaard | 204/84 |
| 3,616,442 | 10/1971 | Cheng et al. | 204/257 |
| 3,878,072 | 4/1975 | Cook et al. | 204/95 |
| 3,884,777 | 5/1975 | Harke et al. | 204/84 |
| 3,969,201 | 7/1976 | Oloman et al. | 204/83 |

FOREIGN PATENT DOCUMENTS 1335541 7/1963 France.

Primary Examiner—G. L. Kaplan
Attorney, Agent, or Firm—Karl F. Ross

[57] ABSTRACT

The present invention provides a method for preparing an aqueous treatment solution containing at least hydrogen peroxide ions and hydroxyl ions in a predetermined concentration.

The method according to the invention consists of using an electrolytic cell comprising a porous cathode, and circulating simultaneously in contact with said porous cathode an oxygen-containing compressed gas and a weakly alkaline initial aqueous solution, so as to cause the formation of hydrogen peroxide ions and hydroxyl ions by reduction of the oxygen, said circulation being continued until said solution attains said predetermined concentration, said solution having attained said concentration then being discharged to the outside for use as the treatment solution in various applications.

Application in particular to bleaching, pollution control etc.

1 Claim, 6 Drawing Figures

METHOD FOR PREPARING AN AQUEOUS TREATMENT SOLUTION CONTAINING AT LEAST HYDROGEN PEROXIDE IONS AND HYDROXYL IONS IN PREDETERMINED CONCENTRATIONS

FIELD OF THE INVENTION

This invention relates to a method and reactor for preparing an aqueous treatment solution containing at least hydrogen peroxide ions and hydroxyl ions in predetermined concentrations.

BACKGROUND OF THE INVENTION

Among known bleaching agents, hydrogen peroxide is at the present time being increasingly used, in particular for bleaching materials such as textiles or paper pulp. Hydrogen peroxide has the great advantage over other bleaching agents, in particular chlorine and its compounds, in that because of its mild action, it attacks the fibers of the material to be treated to a much lesser extent, while exerting a more durable action and giving a better finish.

Hydrogen peroxide is generally used in bleaching in the form of a stabilized alkaline solution of low peroxide concentration. The action of the hydrogen peroxide in bleaching consists essentially of destroying or decolourising the natural dyes by oxidation, or by rendering them soluble. Even though the mechanism of these reactions has still been little studied, it is generally assumed that the hydrogen peroxide ion $HOO^-$ is responsible for the bleaching.

Present-day bleaching solutions based on hydrogen peroxide have however the great disadvantage with respect to other conventional bleaching solutions (in particular hypochlorite-based solutions) of being relatively costly, so that their widespread use is very dependent on economic considerations, in particular when large quantities of low-value material such as paper pulp are to be treated. Present-day bleaching solutions are nearly always prepared by simple dissolving and dilution, starting from commercially available chemicals. Commercially available hydrogen peroxide is a particularly costly substance, as it is manufactured only in a small number of large industrial plants, and it has therefore to be highly concentrated for storage and transport purposes before being distributed.

At the present time there is a need to replace these preparation methods using highly concentrated commercially available constituents, by in situ manufacturing methods which enable dilute solutions of hydrogen peroxide to be produced directly, in order to reduce bleaching costs. However, up to the present time no satisfactory method has appeared.

Hydrogen peroxide is used not only for bleaching purposes, but also in an increasing number of other processes, in particular in the pollution control field. However, treatment solutions used for this purpose are likewise almost always prepared from highly concentrated commercial constituents, and they thus have the same disadvantages as heretofore stated.

It has been proposed for some time to prepare hydrogen peroxide electrolytically, by reducing oxygen at a cathode in an alkaline medium. However, the methods proposed up to the present time all aim at large-scale production of hydrogen peroxide, so that the products obtained by these methods are much too concentrated for direct use as treatment solutions (the alkaline solutions used in these methods have a very high initial concentration).

OBJECT OF THE INVENTION

The object of the present invention is to obviate the aforesaid disadvantages by proposing an electrolytic preparation process enabling dilute solutions of hydrogen peroxide to be produced in situ for direct use as treatment solutions in various applications.

SUMMARY OF THE INVENTION

The present invention provides a method for preparing an aqueous treatment solution containing at least hydrogen peroxide ions and hydroxyl ions in predetermined concentrations, said predetermined concentrations being variable within a concentration range such that said treatment solution has a total hydrogen peroxide concentration of 0.1 to 10 grams/liter of solution, and a pH less than 14. The method of the invention comprises:

using at least one electrolytic cell comprising a porous cathode and an anode, bringing into the proximity of said porous cathode, an aqueous alkaline solution, the initial pH of which is chosen at a lower value than the required value for the treatment solution to be prepared, said initial solution constituting the catholyte, circulating simultaneously, in contact with said porous cathode, an oxygen-containing compressed gas and said catholyte, so as to form hydrogen peroxide ions and hydroxyl ions at said cathode by electrical reduction of the oxygen on passing an electric current through said cell, continuing said circulation in contact with said porous cathode until said catholyte attains said predetermined concentration of hydrogen peroxide ions and hydroxyl ions, then finally discharging to the outside the catholyte which has attained said predetermined concentration, the catholyte thus discharged constituting said treatment solution.

The present invention also provides an electrochemical reactor for effecting said method.

One of the essential characteristics of the defined method is thus the utilization of the known principle of producing hydrogen peroxide by reducing oxygen at a cathode in order to directly prepare an aqueous treatment solution having a low concentration of hydrogen peroxide ions and hydroxyl ions (instead of utilising this principle to prepare products of high hydrogen peroxide concentration as in the known state of the art). The direct electrolytic production of such a low concentration treatment solution is essentially possible because of the advantageous use of an initial weakly concentrated alkaline solution as the catholyte (the initial catholyte concentration being chosen at a lower level than the required hydroxyl ion concentration for the treatment solution), and by the correct choice of conditions under which the electrolysis is carried out, this electrolysis leading to a progressively increasing concentration of hydrogen peroxide ions and hydroxyl ions in the catholyte, which is discharged to the outside when the required treatment solution concentrations are reached.

The parameters which govern the method according to the invention (initial concentration of alkaline solution, quantity of electricity passing through the reactor, reactor dimensions etc.) are advantageously adjusted so that the solution discharged from the electrochemical reactor has a total hydrogen peroxide concentration (i.e. hydrogen peroxide ions $HO_2^-$ + hydrogen peroxide $H_2O_2$) of 0.1 to 10 grams/liter of solution, and a pH less than 14 (the aforesaid pH and hydrogen peroxide ranges correspond substantially to those encountered in conventional treatment solutions prepared by classical dilution methods). The alkaline solution fed initially into the electrochemical reactor is chosen in particular such that its initial pH lies between 7 and 12. The alkali which makes up this initial solution can be any known alkali, such as caustic soda, potash etc. However, caustic soda is especially used because of its low cost.

This direct electrolytic preparation of a treatment solution can be carried out by two different methods, namely a batch and a continuous method. The continuous method consists of operating with a catholyte volume which is chosen, depending on the cathode capacity, such that it can be raised to the required concentration in a single passage across the cathode, this method thus allowing continuous production of the treatment solution by continuously feeding initial solution across the cathode. Such a method is particularly suitable for the continuous production of small quantities of treatment solution.

The batch method consists of operating with a catholyte volume substantially greater than the volume which could be processed in a single passage by virtue of the cathode capacity, and of recycling this volume until it reaches the required concentration. Such a method is particularly suitable for the batch production of large quantities of treatment solution.

In addition, it can be envisaged to incorporate a certain number of additives in the initial solutions to be converted into bleaching solutions by electrolysis, and in particular silicate buffers (depending on the hydroxyl ion concentration) to keep the solution pH within a range of optimum values, preferably between 10.5 and 11, at the beginning of the bleaching reaction.

The treatment solution obtained by the method according to the invention can in particular be used as a bleaching solution for bleaching materials such as textiles, pulp, paper pulp (cellulose pulp or high yield pulp), cardboard (surface bleaching), starch, bran etc. These materials can be bleached either directly by contact or impregnation if the bleaching solution is prepared by a continuous method, or indirectly by conventional systems such as bleaching towers (batch or semi-batch) if the bleaching solution is prepared by a batch method.

With regard to the bleaching of paper pulp, the constituents of the bleaching solution must notably satisfy precise concentration conditions in order to give good bleaching performance. These concentration conditions are generally expressed by paper manufacturing experts in terms of the weight of pure constituents to be incorporated in a dry pulp, and these then have to be recalculated (to express the quantity of constituent per unit of bleaching solution volume), taking into account both the initial consistency of the pulp to be bleached and the final density of the pulp obtained after incorporating the bleaching solution. In this respect, the pulp to be bleached is generally never dry, but instead has an initial greater or lesser consistency depending on the pretreatment given to the pulp, this initial consistency generally lying between 20 and 88% (the consistency being given in times of the proportion of fibrous material in the wet pulp). Likewise, a pulp of a determined consistency must generally be further diluted during the bleaching operation in order to facilitate treatment, this dilution being carried out by adding the bleaching solution. The final density of the pulp obtained after adding this solution must generally be between 5 and 18%.

Thus, in the case of a bleaching solution in which the alkali is caustic soda, it is generally assumed that the solution constituents must have the following concentrations (referred to the dry pulp) to give correct bleaching: hydrogen peroxide 1 to 2 grams per 100 grams of dry pulp, and caustic soda 0.5 to 2.5 grams per 100 grams of dry pulp. In order to be able to bleach paper pulp in every practical case (i.e bleaching a pulp having an initial consistency before bleaching which can vary from 20 to 88%, and a final density after adding the bleaching solution which can lie between 5 and 18%), the aforesaid conditions mean that it must be possible to prepare a bleaching solution in which the hydrogen peroxide concentration can vary from 0.4 to 9 grams per liter of bleaching solution, and the caustic soda concentration can vary from 0.2 to 11 grams per liter of bleaching solution, the respective proportions of hydrogen peroxide and caustic soda in the solution being such that the weight ratio of the hydrogen peroxide to the caustic soda is between 0.4 and 4 (as can be shown by relatively simple calculations). The method according to the invention enables any bleaching solution within these concentration ranges to be prepared by suitably controlling the initial concentration of the caustic soda solution used as the catholyte, and the quantity of electricity fed through the electrochemical reactor.

The treatment solution obtained by the method according to the invention can be used not only for bleaching but for any other treatment which utilizes the various properties of hydrogen peroxide, such as its oxidation-reduction effect (chemical reactions for destroying bad odors or an excess of strong oxidants such as chlorine), its bactericide effect or its action as a source of dissolved oxygen. The treatment solution according to the invention can thus, by way of example, be used for the following: treatment of swimming pool water, treatment of domestic effluents, treatment of fish breeding water, addition of oxygen in dissolved form to living media requiring oxygen, etc.

BRIEF DESCRIPTION OF THE DRAWING

The accompanying drawing illustrates, diagrammatically by way of example, two embodiments and modifications of electrochemical reactors for effecting the method for preparing the treatment solution according to the invention.

SPECIFIC DESCRIPTION

Figure 1:
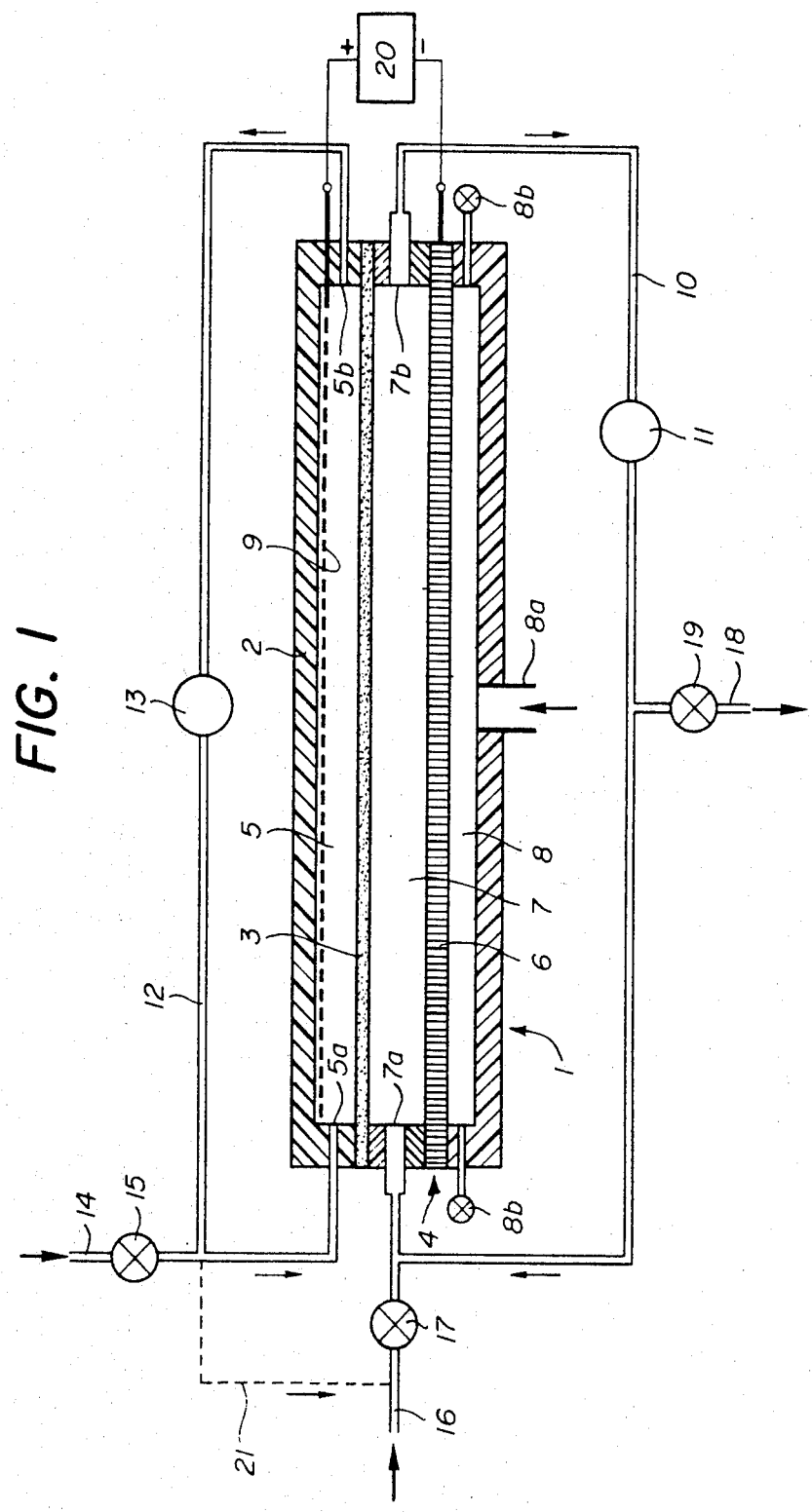
FIG. 1 is a diagrammatic cross-section through a first embodiment.

The first embodiment shown in FIG. 1 is an electrochemical reactor of the "closed cell" type, which enables the treatment solution of the invention to be prepared by a batch method. The reactor shown in FIG. 1 comprises a single elementary cell 1 consisting of a substantially horizontal casing 2 of an electrically insulating material. The casing 2 is divided by a horizontal flat diaphragm 3 into two superposed compartments 4 and 5, namely a lower cathode compartment 4 and an upper anode compartment 5. The cathode compartment 4 is itself divided by a horizontal flat porous cathode 6 into two superposed chambers 7 and 8, namely an upper chamber 7 and a lower chamber 8. The upper chamber 7 is designed to contain the catholyte, and is provided at its opposing ends with an inlet nozzle 7a and an outlet nozzle 7b for the catholyte. The purpose of the lower chamber 8 is to feed compressed air (of the order of 100 to 1000 grams/cm$^2$) to the porous cathode 6 through an inlet nozzle 8a connected to a source of compressed air (not shown), the excess compressed air being able to escape through the safety valves 8b. The porous electrode 6 (gaseous diffusion electrode) is advantageously constructed of a hydrophobic conducting material able to hold back the water while allowing the air to pass. The porous cathode 6 can thus for example be a carbon felt impregnated with a Teflon suspension, or porous blocks of vitreous carbon of open porosity, the thickness of this cathode being advantageously between 5 and 10 mm.

The anode compartment 5 is designed to contain the anolyte, and is fitted with an anode 9 (or counter electrode) disposed against its upper wall, and an inlet nozzle 5a and outlet nozzle 5b for the anolyte, these being disposed at its opposing ends. The anode 9 is advantageously constructed of a conducting material which is chemically and electrochemically inert towards the anolyte. The anode 9 can for example be a material such as platinum-plated titanium, graphite, suitably chosen stainless steel or any other material which constitutes a dimensionally stable anode. The flat diaphragm 3 which separates the anolyte from the catholyte is advantageously in the form of a cation exchange membrane or a semi-permeable microporous diaphragm.

In the reactor of FIG. 1, the outlet nozzle 7b and inlet nozzle 7a of the chamber 7 are connected together by means for recycling the catholyte, in the form of a conduit 10 and a pumping member 11. Likewise, the outlet nozzle 5b and inlet nozzle 5a of the anode compartment 5 are connected together by means for recycling the anolyte, in the form of a conduit 12 and a pumping member 13. The reactor also comprises a first feed conduit 14 connected by way of a valve 15 to a part of the conduit 12 close to the inlet nozzle 5a of the anode compartment 5, a second feed conduit 16 connected by way of a valve 17 to a part of the conduit 10 close to the inlet nozzle 7a of the chamber 7, and a discharge conduit 18 connected by way of a valve 19 to the conduit 10 upstream of the pumping member 11.

The first feed conduit 14 is used to feed into the anode compartment 5 an initial caustic soda solution having an initial caustic soda concentration exceeding the required treatment solution concentration, this initial solution forming the anolyte for the reactor. The second feed conduit 16 is used to feed into the chamber 7 an initial caustic soda solution having an initial concentration less than the required treatment solution concentration, this solution constituting the catholyte for the reactor. The discharge conduit 18 enables the catholyte to be discharged to the outside after it has been recycled a certain number of times to reach the required concentration, the discharged catholyte then constituting the treatment solution.

The porous cathode 6 and anode 9 of the reactor are connected to the negative and positive poles respectively of a direct current source 20.

The electrochemical reactor described operates in the following manner. The hydrogen peroxide and caustic soda concentrations in the treatment solution to be prepared are firstly chosen in accordance with the required application (for example for bleaching a paper pulp of given initial consistency to within a final determined density), then the feed valves 15 and 17 are opened, and a caustic soda solution of an initial concentration exceeding the concentration of the treatment solution to be prepared is fed through the feed conduit 14 into the anode compartment 5, and a caustic soda solution of an initial concentration less than the concentration of the treatment solution to be prepared is fed through the feed conduit 16 into the chamber 7 fitted with the cathode 6 (the fed quantities of solution are a function of the respective volumes of the chambers 5 and 7). The feed valves 15 and 17 are closed, current is supplied to the electrochemical reactor, and the means for feeding air to the cathode 6 and the means for recycling the catholyte and anolyte are switched on. The reactions which then occur at the electrodes are as follows.

At the anode:

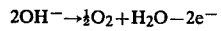

$$2OH^- \rightarrow \tfrac{1}{2}O_2 + H_2O - 2e^-$$

At the cathode:

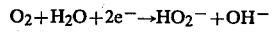

$$O_2 + H_2O + 2e^- \rightarrow HO_2^- + OH^-$$

It can thus be seen that when the catholyte passes through the chamber 7, oxygen is reduced at the cathode to form hydrogen peroxide ions $HO_2^-$ and hydroxyl ions $OH^-$, and as the catholyte continues to recycle, the concentration of the hydrogen peroxide ions and hydroxyl ions in the catholyte progressively increases. Likewise, as the anolyte passes through the anode compartment 5, the caustic soda concentration in the anolyte progressively falls. The catholyte and anolyte are recycled until the hydrogen peroxide ion and hydroxyl ion concentrations in the catholyte reach the required values. When these values are reached, electrolysis is halted, and the catholyte is discharged to the outside through the discharge conduit 18, the discharged catholyte forming the required treatment solution to be used for any appropriate application. The anolyte, in which the caustic soda concentration has been greatly reduced, is also discharged from the reactor. This discharged anolyte can be recovered to serve as the catholyte for preparing a new supply of treatment solution (its transfer being indicated diagrammatically on the drawing by the dashed line 21).

In the described embodiment, the reactor does not have to be necessarily horizontal. It can be particularly advantageous to dispose the reactor in a slightly inclined position (of the order of 10°), to prevent any oxygen forming at the anode from accumulating in the anode compartment, and to thus facilitate its discharge to the outside.

In the electrochemical process described heretofore, it has been stated that the cathode solution containing hydrogen peroxide constitutes the useful product for direct use as the treatment solution in various applications, and the anode solution depleted in caustic soda constitutes only a by-product of little interest (except for the said recovery). However, it is possible to up-value this by-product constituting the anode solution by making small modifications to the previously described electrochemical process, to enable an anode solution containing hypochlorite to be produced. To do this, it is simply necessary to feed into the anode compartment 5 an initial aqueous solution containing both caustic soda in a higher concentration (about 10 g/l) and sodium chloride (also about 10 g/l). By feeding this initial solution containing sodium chloride into the anode compartment, it is possible to feed an initial solution also containing sodium chloride into the cathode compartment, to improve the conductivity of the solutions and reduce the ohmic drop through the cation exchange separator (this sodium chloride does not participate in the cathode reaction, but serves only as a supporting salt).

The purpose of the sodium chloride in solution in the anode compartment is to cause formation of gaseous chlorine in contact with the anode, in accordance with the reaction:

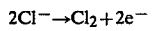

$$2Cl^- \rightarrow Cl_2 + 2e^-$$

The gaseous chlorine thus formed reacts with the caustic soda to give the hypochlorite, by the reaction:

$$Cl_2 + 2NaOH \rightarrow NaOCl + NaCl \cdot H_2O$$

As the anolyte is continuously recycled, its hypochlorite concentration progressively rises and its caustic soda concentration progressively falls.

The anode solution obtained at the end of recycling, charged with hypochlorite, can then be used in combination with the cathode solution charged with hydrogen peroxide, for treating any suitable material. This treatment is advantageously effected by firstly bringing the anode solution containing hypochlorite into contact with the material to be treated, then bringing the cathode solution containing hydrogen peroxide into contact with this material. The combined use of hypochlorite and hydrogen peroxide has the great advantage of giving rise to the formation of "singlet" oxygen, which has proved to be an excellent oxidizing agent.

In the embodiment of the "closed cell" type heretofore described, the means for recycling the catholyte and anolyte could be dispensed with, and the single reactor cell 1 could be replaced by a plurality of cells disposed in series one after the other, so as to give the required concentration by a single passage through the various cells, this modification then being allied to a continuous production method.

Figure 2:
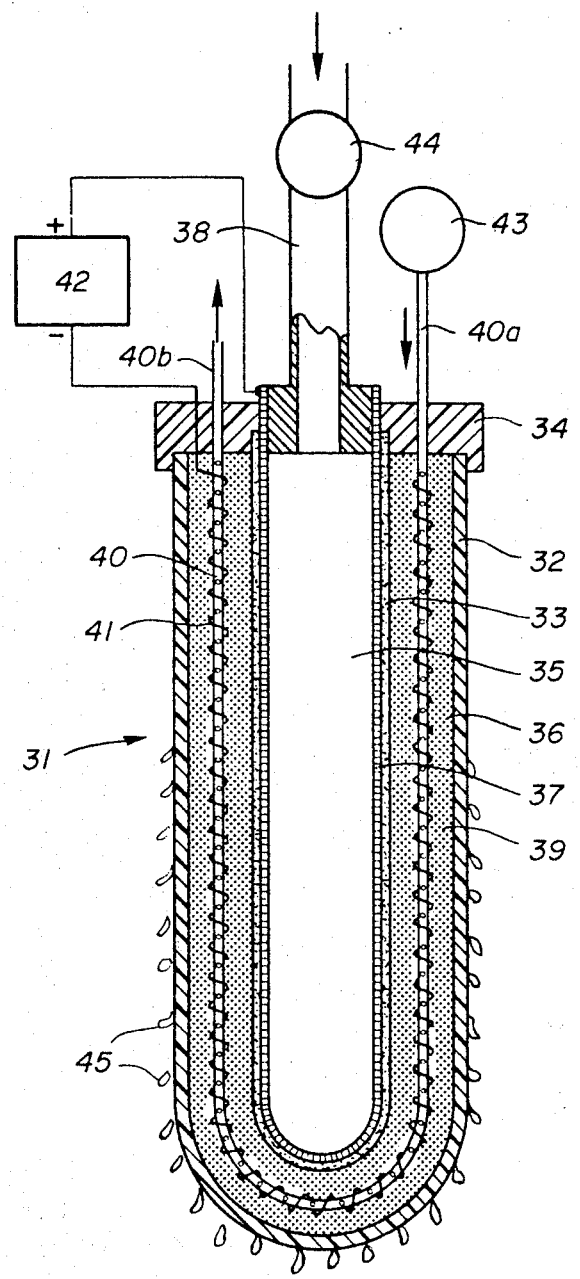
FIG. 2 is a diagrammatic cross-section through a second embodiment.

The second embodiment shown in FIG. 2 represents an electrochemical reactor of "open cell" type, for preparing treatment solution according to the invention by a continuous method. The electrochemical reactor shown in FIG. 2 comprises a single elementary tubular cell 31. The cell 31 is composed of two concentric porous tubular sheaths 32 and 33 with round bottoms, namely an outer sheath 32 constructed of an electrically insulating porous material such as porous ceramic or porous polypropylene, and an inner sheath 33 constructed of a hydrophilic microporous insulating material such as cloth or felt (for example of nylon, glass fiber or polyethylene). The open end of the sheaths 32 and 33 is closed by a flat cover 34 of an insulating material. The inner sheath 33 acts as a microporous diaphragm which divides the cell 31 into two coaxial compartments 35 and 36, namely a central cylindrical anode compartment 35 and a peripheral annular cathode compartment 36. The central anode compartment 35 is fitted with a porous tubular anode 37 disposed against the inner wall of the microporous diaphragm 33, the porous anode 37 being constructed of a material such as porous graphite or porous vitreous carbon. The anode compartment 35 is designed to contain the anolyte, and is provided upperly with an inlet nozzle 38 through the cover 34. The peripheral cathode compartment 36 is filled with a tightly packed bed of electrically conducting particles 39 (such as granules of graphite and active carbon, or carbon fibres), to serve as a three dimensional cathode. This bed is made partly hydrophobic by treating it with a Teflon suspension. The bed of particles 39 is traversed over its entire length by a conduit 40 pierced with a plurality of apertures, its ends being connected respectively to an inlet nozzle 40a and an outlet nozzle 40b provided in two diametrically opposing positions in the cover 34. About the conduit 40 there is wound a wire current collector 41 (for example of gold), for connection to the negative pole of a direct current source 42, the positive pole being connected to the anode 37.

The perforated conduit 40 is connected by way of the inlet nozzle 40a to a source of compressed air 43 which can feed cold compressed air at a pressure of the order of 20 to 50 g/cm$^2$, the purpose of the conduit 40 therefore being to feed compressed air to the dispersed cathode 39 (the air being cold in order to maintain a temperature inside the cell 1 of the order of 15° to 20° C., so as to optimise the electrolysis efficiency). The inlet nozzle 38 of the anode compartment 35 is connected via a pumping member 44 to a reservoir (not shown) containing a caustic soda solution having a concentration substantially identical to (or slightly greater than) the caustic soda concentration of the treatment solution to be prepared. The purpose of the pumping member 44 is to continuously feed the anode compartment 35 with a caustic soda solution under pressure, the pressure at which the caustic soda solution is fed being chosen such that the pressure in the anode compartment 35 is always greater than the pressure in the cathode compartment 36.

The described electrochemical reactor operates in the following manner: the hydrogen peroxide and caustic soda concentrations in the treatment solution to be prepared are chosen, current is fed to the cell 31, and the means for feeding the caustic soda solution to the anode compartment 35 and the means for feeding air to the dispersed cathode 39 are started, and the anode compartment 35 is constantly maintained at a higher pressure than the cathode compartment 36. The caustic soda solution which flows into the anode compartment 35 (forming the anolyte undergoes the anode reaction on contact with the anode 37 (this reaction is identical to that previously described), so that it becomes charged with oxygen while losing part of its caustic soda concentration. This solution, depleted in caustic soda, then passes through the microporous diaphragm 33 because of the pressure difference. When it reaches the cathode compartment 36, the solution depleted in caustic soda (which constitutes the catholyte) then undergoes the cathode reaction (this reaction being identical to that previously described), so that it becomes charged in hydrogen peroxide ions and hydroxyl ions before being discharged to the outside in the form of droplets 45 on the outer wall of the porous ceramic 32. The parameters which govern the operation of the cell 31 (voltage and current density fed to the cell, pressure in the cathode and anode compartments etc.) are chosen such that the catholyte becomes enriched in hydrogen peroxide and hydroxyl ions to the required concentration for the treatment solution just as the catholyte reaches the exterior in the form of droplets 45, so that the collected droplets 45 form the treatment solution for use in the required application.

Figure 3:
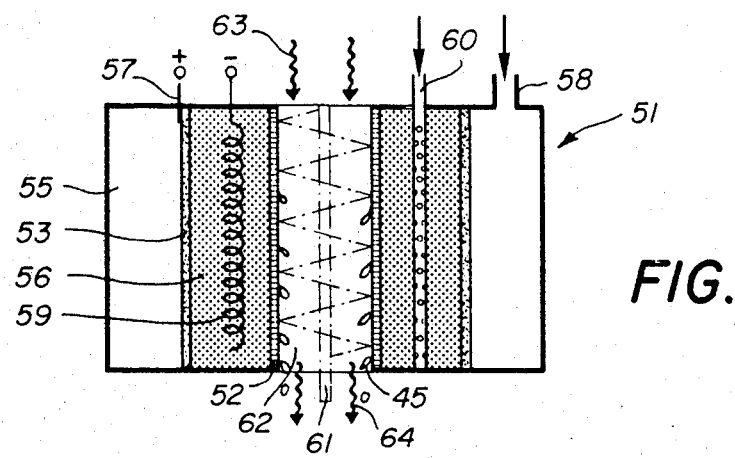
FIG. 3 is a diagrammatic cross-section of a modification of FIG. 2.

The reactor 51 shown in FIG. 3 constitutes a modification of the reactor 31 of FIG. 2, and in which the positions of the cathode and anode compartments are reversed relative to FIG. 2, while the other members of the reactor are substantially identical. The reactor 51 comprises essentially two coaxial annular compartments 55 and 56 separated from each other by a microporous cylindrical diaphragm 53, namely an outer anode compartment 55 provided with an anode 57 and an inlet nozzle 58 for the caustic soda solution, and an inner cathode compartment 56 provided with a cathode 59 and inlet nozzle 60 for feeding oxygen. The inner cylindrical wall 52 of the cathode compartment 56 is constituted by a porous ceramic which allows the catholyte which has been concentrated in hydrogen peroxide ions and hydroxyl ions to pass, the concentrated catholyte thus flowing to the outside in the form of droplets 45.

The treatment solution thus produced continuously in the form of droplets by the "open cell" reactors of FIGS. 2 and 3 can particularly advantageously be then used directly to carry out the required treatment by the contact or impregnation method.

In this respect, FIG. 3 shows by way of example one possible application for the reactor 51 illustrated in this Figure, and consisting of the direct contact bleaching of material present in the form of pulp or fibre (such as paper pulp). For this application, the reactor 51 is fitted with an Archimedes screw 61 rotatably mounted in the tubular channel 62 defined by the inner cylindrical wall 52. The material to be bleached is fed continuously to one end of the channel 62 (the feed being indicated diagrammatically by the arrow 63 on the drawing), and is then progressively bleached in contact with the droplets 45 as it is moved by the screw 61 along the channel 62 (material outlet shown diagrammatically on the drawing by the arrow 63).

Figure 4:
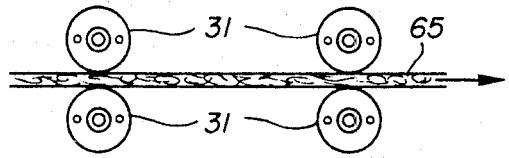
FIG. 4 is a diagrammatic cross-section showing a first application of the reactor of FIG. 2.

FIG. 4 shows a first possible application of the reactor illustrated in FIG. 2, and consisting of bleaching material in the form of a continuous band 65 (such as fibrous sheet, foil), using a plurality of pairs of reactors 31 mounted rotatably in the manner of rollers, between which the continuous band 65 moves.

Figure 5:
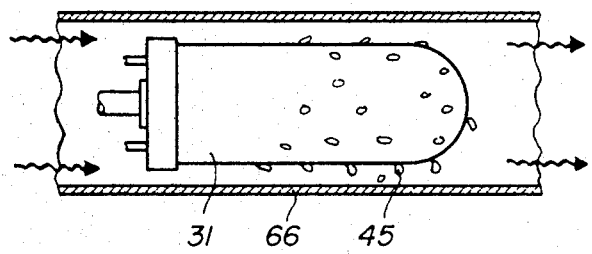
FIG. 5 is a diagrammatic cross-section showing a second application of the reactor of FIG. 2.

FIG. 5 shows a second possible application for the reactor of FIG. 2, and consisting of treating liquid substances (such as regeneration of swimming pool water) using a reactor 31 mounted inside a tubular conduit 66 through which the liquid to be treated circulates (as a modification, an annular Archimedes screw could be mounted between the reactor 31 and conduit 66, to provide treatment similar to that shown in FIG. 3).

Figure 6:
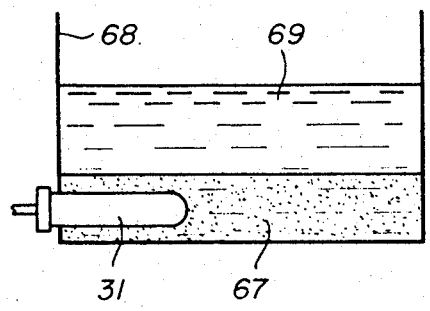
FIG. 6 is a diagrammatic cross-section showing a third application of the reactor of FIG. 2.

FIG. 6 shows a third possible application, consisting of regenerating a liquid medium using a reactor 31 inserted within a biological sand filter 67 disposed on the bottom of a container 68 containing the liquid medium 69 to be regenerated.

EXAMPLE 1

A cell for producing treatment solution analogous to FIG. 1 is used, having the following characteristics:
cathode of graphite felt made hydrophobic in depth by suitable treatment;
anode of platinum plated titanium;
cation exchange membrane of the type sold commercially under the name of NAFION 425 (by Messrs. Du Pont de Nemours). The area of the separator is 2.85 $dm^2$.

An aqueous caustic solution having an initial caustic soda concentration of 0.04 g/l is fed into the cathode compartment, and an aqueous caustic soda solution having an initial soda concentration of 1.1 g/l is fed into the anode compartment, the solution volume fed into each compartment being 560 $cm^3$ (the temperature of these solutions being kept at 22° C.).

Electricity is fed to the cell by connecting the terminals to a power source, and the means for feeding air to the cathode and the means for recycling the catholyte and anolyte are started. The cell is then adjusted to deliver a final treatment solution (catholyte after recycling) containing 1.8 g/l of hydrogen peroxide and 2.88 g/l of caustic soda. To attain this, the voltage at the cathode is adjusted so that it is equal to $-950$ mV relative to a Hg, HgO reference electrode (corresponding to a potential difference across the cell terminals of 3.5 Volts and an average current density of 1 A/$dm^2$), and the catholyte and anolyte are recycled for 50 minutes, after which the catholyte reaches the required hydrogen peroxide and caustic soda concentrations (as stated heretofore). The catholyte is then discharged to the outside (555.5 $cm^3$ are collected) for use as a treatment solution.

The final hydrogen peroxide Faraday efficiency is 66.4%, and the energy consumption is 8.3 kwh per kg of 100% hydrogen peroxide.

The treatment solution thus obtained is used by way of example for bleaching mechanical wood pulp. This treatment solution (555.5 $cm^3$) is then immediately heated to 70° C., then intimately mixed with 444.5 g of a mechanical wood pulp having an initial density of 22.5% (i.e. 100 g of dry pulp) and an initial whiteness degree of 55. The final pulp density obtained after this intimate mixing is 10% (the hydrogen peroxide and caustic soda quantities with respect to the dry pulp then being 1% and 1.6% respectively).

After mixing, the mixture is left for two hours while maintaining the pulp temperature at 70° C. The pH of the pulp which was initially 11.4 then falls to 8.15 at the end of this two hour period, and the degree of whiteness rises from 55 to 63.

By way of comparison, an analogous bleaching operation is carried out by purely chemical means using a synthesis treatment solution prepared from commercial hydrogen peroxide and caustic soda (the treatment being identical with regard to the batch of pulp used, the density of the pulp, the reagent concentration, the temperature and time). A degree of whiteness of 62.8 is obtained.

EXAMPLE 2

A cell for producing treatment solution practically identical to that of example 1 is used, except that a bed of active carbon granules is disposed in the anode compartment (interposed between the compartment wall and the current collector, which is constituted by a platinum plated titanium grid).

An aqueous solution of caustic soda and sodium chloride comprising initially 0.04 g/l of caustic soda and 10 g/l of sodium chloride is fed into the cathode compartment of the cell, and an aqueous solution of soda and sodium chloride comprising initially 10 g/l of caustic soda and 10 g/l of sodium chloride is fed into the anode compartment (the solution volumes fed into each compartment being 650 cm$^3$, these solutions being kept at 15° C.).

The cell is switched on, the cathode voltage is adjusted to −965 mV relative to the Hg, HgO reference electrode (the potential difference across the cell terminals being then 2.2 V and the average current density 3.5 A/dm$^2$), and the catholyte and anolyte are recycled for 20 minutes. After recycling, a solution is obtained in the cathode compartment containing 2.2 g/l of hydrogen peroxide and 2.9 g/l of caustic soda, and a solution is obtained in the anode compartment containing 1.6 g/l of hypochlorite. The final Faraday efficiency of the hydrogen peroxide production is 67%, and the energy consumption is 5.11 kwh/kg of 100% hydrogen peroxide.

The solutions thus obtained are used for bleaching mechanical wood pulp. To carry out this bleaching, the following method can be used: 100 cm$^3$ of the anode solution containing the hypochlorite is taken and poured into 444.5 g of a pulp having an initial density of 22.5% (100 g of dry pulp) and an initial degree of whiteness of 55. This pulp-solution mixture is raised to 70° C. in 15 minutes while keeping the mixture properly mixed. 455.5 cm$^3$ of the cathode solution containing the hydrogen peroxide are taken and added to the mixture. The mixture is intimately stirred, and then left to lie for 2 hours at 70° C. The final mixture thus obtained consists of a pulp having a density of 10% (containing at the outset 1% of hydrogen peroxide with respect to the dry pulp).

The degree of whiteness measured after rinsing the pulp is 71 (initial degree of whiteness 55).

We claim:

1. An electrolytic oxidation and reduction method for preparing an aqueous treatment solution comprising hydrogen peroxide and hydroxyl ions in predetermined concentrations variable within a concentration range such that said treatment solution has a total hydrogen peroxide concentration of 0.1 to 10 g of $H_2O_2$/liter of solution and a predetermined pH of less than 14, which comprises the steps of:

(a) applying an electric current across at least one flat, horizontal electrolytic cell comprising a horizontal anode in contact with an anolyte in a flat, horizontal anolyte compartment and a porous, horizontal cathode in contact with a catholyte in a flat, horizontal catholyte compartment, said anode and said cathode being separated from one another by a horizontal cationic exchange membrane or a horizontal semipermeable microporous diaphragm, said catholyte being constituted by an aqueous alkaline solution of an initial pH of 7 to 12 which is lower than the predetermined pH value of the treatment solution to be prepared, and wherein said anolyte compartment is located above said catholyte compartment;

(b) circulating in contact with said porous cathode during application of said electric current, said catholyte, while feeding an oxygen-containing compressed gas through said cathode into said catholyte compartment to form hydrogen peroxide ions and hydroxyl ions at said cathode by electrolytic reduction of the oxygen;

(c) continuing said catholyte circulation in contact with said porous cathode, without otherwise altering its chemical composition until said catholyte attains said predetermined concentration of hydrogen peroxide ions and hydroxyl ions to form an aqueous treatment solution;

(d) following step (c), terminating said circulation and cutting off said electric current; and (e) discharging the electrolyte as said aqueous treatment solution with a weight ratio of hydrogen peroxide to sodium hydroxide between 0.4 and 4.

* * * * *